United States Patent
Bae et al.

(10) Patent No.: US 10,300,456 B2
(45) Date of Patent: May 28, 2019

(54) METHOD FOR MANUFACTURING ACTIVATED CARBON

(71) Applicants: Hyundai Motor Company, Seoul (KR); Inha University Research and Business Foundation, Incheon (KR)

(72) Inventors: Shin Tae Bae, Hwaseong-si (KR); Youjin Park, Bucheon-si (KR); Soo Jin Park, Seoul (KR); Young Jung Heo, Danyang-eup (KR)

(73) Assignees: Hyundai Motor Company, Seoul (KR); Inha University Research and Business Foundation, Incheon (KR)

( * ) Notice: Subject to any disclaimer, the term of this patent is extended or adjusted under 35 U.S.C. 154(b) by 0 days.

(21) Appl. No.: 15/287,478

(22) Filed: Oct. 6, 2016

(65) Prior Publication Data

US 2018/0001294 A1    Jan. 4, 2018

(30) Foreign Application Priority Data

Jul. 4, 2016    (KR) .................. 10-2016-0084391

(51) Int. Cl.
| | | |
|---|---|---|
| *C01B 31/10* | (2006.01) | |
| *B01J 20/20* | (2006.01) | |
| *B01D 53/02* | (2006.01) | |
| *B01J 20/06* | (2006.01) | |
| *B01J 20/30* | (2006.01) | |
| *B01J 20/32* | (2006.01) | |
| *F17C 11/00* | (2006.01) | |
| *C01B 32/336* | (2017.01) | |

(52) U.S. Cl.
CPC .............. *B01J 20/20* (2013.01); *B01D 53/02* (2013.01); *B01J 20/06* (2013.01); *B01J 20/3021* (2013.01); *B01J 20/3078* (2013.01); *B01J 20/3204* (2013.01); *B01J 20/3236* (2013.01); *C01B 32/336* (2017.08); *F17C 11/00* (2013.01); *B01D 2253/102* (2013.01); *B01D 2253/1124* (2013.01); *B01D 2253/25* (2013.01); *B01D 2253/306* (2013.01); *B01D 2253/308* (2013.01); *B01D 2253/311* (2013.01); *B01D 2255/2047* (2013.01); *B01D 2255/2061* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/20792* (2013.01); *B01D 2257/504* (2013.01); *B01D 2258/06* (2013.01); *B01D 2259/4566* (2013.01); *Y02C 10/08* (2013.01)

(58) Field of Classification Search
CPC ....................................................... C01B 32/336
See application file for complete search history.

(56) References Cited

U.S. PATENT DOCUMENTS

| | | | |
|---|---|---|---|
| 6,589,904 B1 * | 7/2003 | Iwasaki .................. | H01G 9/155 |
| | | | 210/348 |
| 9,040,452 B2 * | 5/2015 | Kishimoto .............. | H01M 4/90 |
| | | | 423/231 |

FOREIGN PATENT DOCUMENTS

| | | |
|---|---|---|
| JP | 2001-316106 A | 11/2001 |
| JP | 2002-068723 A | 3/2002 |
| KR | 10-1418868 B1 | 7/2014 |
| KR | 10-2016-0049511 A | 5/2016 |

OTHER PUBLICATIONS

Faltynowicz et al., "Preparation and characterization of activated carbons from biomass material—giant knotweed (*Reynoutria sachalinensis*)," Open Chem., 2015; vol. 13, pp. 1150-1156.

\* cited by examiner

*Primary Examiner* — Stuart L Hendrickson
(74) *Attorney, Agent, or Firm* — Morgan, Lewis & Bockius LLP (57) ABSTRACT

A method for manufacturing activated carbon may include preparing activated carbon precursors, carbonizing the activated carbon precursors by performing a heat treatment on the carbon precursors, equalizing the activated carbon precursors carbonized in the carbonizing, by grinding the activated carbon precursors, and activating the activated carbon precursors by introducing a mixture gas including carbon dioxide and steam into the ground activated carbon precursors and performing a heat treatment on the activated carbon precursors.

20 Claims, 4 Drawing Sheets

METHOD FOR MANUFACTURING ACTIVATED CARBON

CROSS-REFERENCE TO RELATED APPLICATION

The present application claims priority to Korean Patent Application No. 10-2016-0084391, filed Jul. 4, 2016, the entire contents of which is incorporated herein for all purposes by this reference.

BACKGROUND OF THE INVENTION

Field of the Invention

The present invention relates to a method for manufacturing activated carbon.

Description of Related Art

Currently, interest in environmentally-friendly cars is increasing rapidly due to problems such as fossil fuel depletion and greenhouse gas emissions. Especially in the environmentally-friendly cars, a travel distance of an electric vehicle has emerged as an important issue.

For heating and cooling, unlike an internal combustion engine, the electric vehicle has no waste heat source (engine coolant) for heating and no waste power for compressing a coolant. Accordingly, power for a positive temperature coefficient (PTC) heater and for compressing the coolant are additionally required, and thus additional power is consumed. As a result, the travel distance is reduced by about 30 to 50%.

Accordingly, it is necessary to minimize outdoor air introduction in order to preserve cold and warmth. In this case, the concentration of carbon dioxide in a vehicle is increased by carbon dioxide exhausted by passengers, and thus safety problems (about 2,000 ppm or more induces drowsiness, and about 5,000 ppm causes a lapse into dyspnea) are generated.

Accordingly, studies to reduce the carbon dioxide in the vehicle are ongoing. Currently, an air filter (including activated carbon) is applied to some high-end cars. However, this air filter can serve to remove harmful gasses such as volatile organic compounds (VOC) or fine dust, but it is difficult to remove carbon dioxide.

A conventional method for manufacturing activated carbon is performed by carbonizing various vegetable materials such as coconut husks as precursors through a high temperature heat treatment under a non-activated environment, and by additionally performing high temperature chemical or physical activation thereon to have a large number of pores. However, according to this conventional method, surface pore sizes of the manufactured activated carbon are diversified in a wide distribution range of micropores to macropores. As a result, pore uniformity is decreased. Ultra-micropores of one nanometer or less are formed, which causes difficulties.

Thus, studies to improve carbon dioxide adsorptive capacity are urgently required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for manufacturing activated carbon that may form a large number of micropores and may introduce metal oxide particles, and thus may improve selective carbon dioxide adsorptive capacity.

According to various aspects of the present invention, a method for manufacturing activated carbon may include preparing activated carbon precursors, carbonizing the activated carbon precursors by performing a heat treatment on the carbon precursors, equalizing the activated carbon precursors carbonized in the carbonizing, by grinding activated carbon precursors, and activating the activated carbon precursors by introducing a mixture gas including carbon dioxide and steam into the ground activated carbon precursors and performing a heat treatment on the activated carbon precursors.

The method for manufacturing the activated carbon may further include after the activating, introducing metal oxide particles on a surface of the activated carbon by mixing and reacting the activated carbon, a metal salt, and a reducing agent in a solvent.

In the activating, the mixed gas may include the carbon dioxide in an amount of approximately 10 to 50 volume % and the steam in an amount of approximately 50 to 90 volume %.

The activating may be performed in a temperature range of approximately 700° C. to approximately 1000° C.

The activating may be performed while introducing the mixture gas into the activated carbon precursors at a speed that is in a range of approximately 1 ml/hr to approximately 100 ml/hr.

The activating may be performed under a pressure equal to or less than approximately 5 bar.

The activating may be performed for approximately 1 to 5 hrs.

In the introducing of the metal oxide particles, the metal salt may include nickel, manganese, cobalt, zinc, yttrium, copper, iron, and a combination of two or more thereof.

In the introducing of the metal oxide particles, the metal salt may include a manganese nitrate, a magnesium nitrate, a nickel sulfate, a copper nitrate, and a combination thereof.

The introducing of the metal oxide particles may be performed in a temperature range of approximately 80° C. to approximately 120° C.

In the introducing of the metal oxide particles, the reducing agent may include formaldehyde (HCHO), sodium borohydride, lithium aluminum hydride, and a mixture of two or more thereof.

In the introducing of the metal oxide particles, the solvent may include a polyol solvent.

In the introducing of the metal oxide particles, the solvent may include ethylene glycol, diethylene glycol, polyethylene glycol, 1,2-propanediol, dodecanediol, and a mixture of two or more thereof.

The method for manufacturing the activated carbon may further include after the equalizing, selecting the equalized activated carbon precursors by using a sieve having a size in a range of 100 um to 250 um.

The method for manufacturing the activated carbon may further include after the introducing of the metal oxide particles, performing heat treatment in a temperature range of approximately 250° C. to approximately 350° C. in an air atmosphere.

The equalizing may be performed using a ball mill, and a particle size of balls used for the ball mill may be in a range of approximately 1 mm to approximately 20 mm.

A volume of the activated carbon precursors may be in a range of approximately 0.1 volume % to approximately 40 volume % for a total of 100 volume % of the balls used for the activated carbon precursors and the ball mill.

A processing speed of the ball mill may be in a range of approximately 100 rpm to approximately 500 rpm.

A processing time of the ball mill may be in a range of approximately 30 min to approximately 5 hrs.

The carbonizing may be performed in a temperature range of approximately 700° C. to approximately 1000° C.

In the preparing of the activated carbon precursors, the activated carbon precursors may include at least one of poly(vinylidene fluoride), poly(vinylidene fluoride-co-shexafluoropropylene), poly(vinylidene chloride-co-acrylonitrile), poly(vinylidene chloride-co-acrylonitrile-co-methyl methacrylate), poly(vinylidene chloride-co-vinyl chloride), and poly(vinylidene chloride-co-methyl acrylate).

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to various embodiments, the word "ultra-micropore" indicates a pore having a diameter of about 1 nm or less. Further, the word "micropore" indicates a pore having a diameter of about 2 nm or less. In addition, the word "mesopore" indicates a pore having a diameter that is in a range of more than about 2 nm to about 50 nm or less.

As described above, surface pore sizes of the conventional activated carbon are diversified in a wide distribution range of micropores to macropores. As a result, pore uniformity is decreased. Ultra-micropores of about 1 nm or less are formed, which causes difficulties.

Accordingly, various embodiments of the present invention are directed to providing a method for manufacturing activated carbon that may significantly improve carbon dioxide adsorptive capacity thereof by forming a large number of ultra-micropores and simultaneously introducing (or forming) a base active site on a surface of activated carbon.

Figure 1:
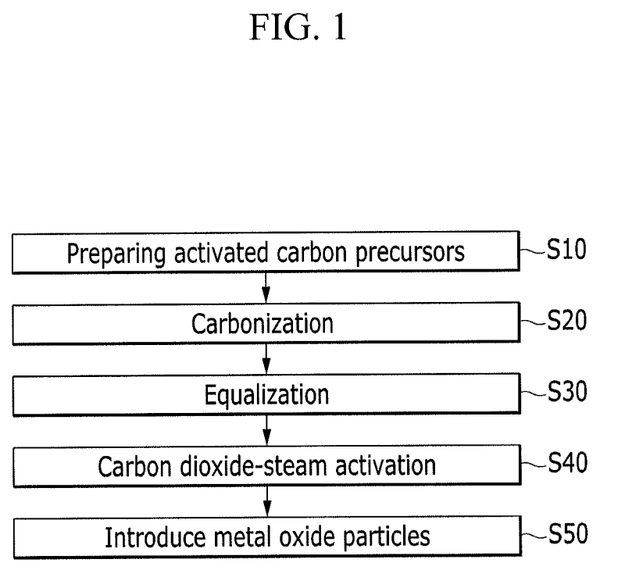
FIG. 1 illustrates a flowchart of a method for manufacturing activated carbon according to various embodiments of the present invention.

FIG. 1 illustrates a flowchart of a method for manufacturing activated carbon according to various embodiments of the present invention. The flowchart of the method for manufacturing activated carbon shown in FIG. 1 is merely exemplary, and the present invention is not limited thereto. Therefore, a method for manufacturing activated carbon may be variously changed.

As shown in FIG. 1, the method for manufacturing activated carbon includes preparing activated carbon precursors (S10), carbonizing the activated carbon precursors by performing a heat treatment thereon (S20), equalizing the activated carbon precursors carbonized in the carbonizing by grinding them (S30), and activating the activated carbon precursors by introducing a mixed gas including carbon dioxide and steam into the ground activated carbon precursors and performing a heat treatment thereon (S40).

The method for manufacturing activated carbon may further include, after the activating (S40), introducing metal oxide particles on a surface of the activated carbon by mixing and reacting the activated carbon, a metal salt, and a reducing agent in a solvent (S50).

According to various embodiments of the present invention, it is possible to manufacture activated carbon that may significantly improve carbon dioxide adsorptive capacity thereof by forming a large number of ultra-micropores and simultaneously introducing a base active site on the surface of the activated carbon.

The activated carbon precursors are activated by using the mixed gas including the carbon dioxide and the steam (carbon dioxide-steam activation) to increase activity of steam particles. Accordingly, it is possible to selectively increase a formation rate of ultra-micropores having a diameter of 1 nm or less on carbon surfaces. Accordingly, a specific surface area of the activated carbon and pore uniformity may be increased.

It is possible to manufacture activated carbon of which carbon dioxide adsorptive capacity may be significantly improved by introducing a base active site such as a metal oxide on the surface of the activated carbon.

Hereinafter, each step of the manufacturing method and the manufactured activated carbon will be described.

In the preparing of the activated carbon precursors (S10), the activated carbon precursors may include starch, coconut husks, citrus peel, orange peel, coffee grounds, bamboo stems, or a combination thereof. However, various embodiments of the present invention are not limited thereto, and any materials based on various vegetable matters can be employed as the activated carbon precursors. Such materials based on the inexpensive vegetable matters can reduce the manufacturing cost of the activated carbon.

The activated carbon precursor may include a polyvinylidene-based polymer material. Specifically, the activated carbon precursor may include at least one of poly(vinylidene fluoride), poly(vinylidene fluoride-co-hexafluoropropylene), poly(vinylidene chloride-co-acrylonitrile), poly(vinylidene chloride-co-acrylonitrile-co-methyl methacrylate), poly(vinylidene chloride-co-vinyl chloride), and poly(vinylidene chloride-co-methyl acrylate).

The carbonizing of the activated carbon precursors by using a heat treatment (S20) may be performed in an inert gas atmosphere. The inert gas may include nitrogen or argon, but various embodiments of the present invention are not limited thereto.

A temperature of the heat treatment for the carbonizing (S20) may be in a range of about 700° C. to about 1000° C. The carbonizing may not be completed under a predetermined low temperature. Since the carbonization is sufficiently performed in a temperature range of about 700° C. to about 1000° C., it is not necessary to perform the heat treatment at a temperature that exceeds about 1000° C. In the case of the temperature that exceeds about 1000° C., unnecessary costs may be generated, and the carbonization yield may be reduced.

Next, the activated carbon precursors carbonized in the carbonizing are ground in the equalizing (S30). The equalizing (S30) may be performed by using the ball mill, and materials of a ball used for the ball mill and a vessel of the ball mill may include SUS or zirconia ($ZrO_2$), but various embodiments of the present invention are not limited thereto.

A particle size of the ball used for the ball mill may be in a range of about 1 mm to about 20 mm. In the case that the size of the ball is too small, the yield may be rapidly reduced, and a relative content of impurities in particles may be increased. In contrast, in the case that the size of the ball is too large, particles having large sizes may be mainly formed, thereby reducing a ball mill effect.

A volume of the activated carbon precursors may be in a range of about 0.1 volume % to about 40 volume % of a total volume of 100 volume % of the balls used for the activated carbon precursors and the ball mill. In more detail, the volume of the activated carbon precursors may be in a range of about 10 volume % to about 30 volume %. In the case that the volume of the precursor is too large for the volume of the balls, the ball mill effect may deteriorate. In contrast, in the case that the volume of the precursors is too small, heat generated in the ball mill may be increased, thereby reducing the yield.

A processing speed of the ball mill may be in a range of about 100 rpm to about 500 rpm. In the case that the processing speed of the ball mill is too quick, a reaction vessel may be excessively heated. In contrast, in the case that the processing speed of the ball mill is too slow, the ball mill effect may be reduced, thereby causing problems.

A processing time of the ball mill may be in a range of about 30 min to about 5 hrs. In the case that the processing time of the ball mill is too long, a general yield may be reduced, and a general particle size may be reduced. In contrast, in the case that the processing time of the ball mill is too short, the ball mill effect may be reduced, thereby causing problems.

The activated carbon manufacturing method may further include cleaning the precursor by using an acid in order to remove impurities, after the equalizing through the ball mill process. Herein, the acid may include hydrochloric acid, nitric acid, or sulfuric acid, but various embodiments of the present invention are not limited thereto.

In addition, the activated carbon manufacturing method may further include selecting the equalized activated carbon precursors by using a sieve having a size that is in a range of about 100 um to about 250 um, after the equalizing and the acid cleaning. As such, it is possible to manufacture activated carbon capable of equalizing particle sizes, increasing a specific surface area, and removing impurities. The particle size uniformity of the activated carbon is an important factor when the activated carbon is manufactured to apply it to an actual product. For example, when being used for a water purifier filter, a vehicle air conditioner filter, a supercapacitor electrode, or the like, the activated carbon is modified into a pellet or granular shape by mixing it with a binder. In this case, if the particle sizes are not uniform, the performance may be deteriorated. As described above, in the case that the precursors are selected by using the sieve having a size that is in a range of about 100 um to about 250 um, it is possible to use them in a vehicle air conditioner filter.

Next, in step S40, the mixed gas including the carbon dioxide and the steam is introduced into the ground activated carbon precursors, and the heat treatment is performed thereon, such that the activated carbon precursors are activated.

In step S40, the activated carbon precursors are activated by using the mixed gas including the carbon dioxide and the steam (carbon dioxide-steam activation) to increase the activity of steam particles. Accordingly, it is possible to selectively increase a formation rate of ultra-micropores having a diameter of about 1 nm or less on carbon surfaces. Accordingly, a specific surface area of the activated carbon and pore uniformity may be increased.

Specifically, the activated carbon is conventionally formed to have about 50 to 70% of micropores with a diameter of about 2 nm and a large amount (about 30 to 50%) of mesopores with a diameter of about 2 to 50 nm. Accordingly, it is difficult to form ultra-micropores of about 1 nm or less. However, as described above, it is possible to form a large number of ultra-micropores of about 1 nm or less through the oxidizing agent-steam activation.

More specifically, as supported in the following examples, ultra-micropores having a diameter of about 1.0 nm or less may be formed on a surface of the activated carbon through such activation. For example, sizes of the activated carbon may be in a range of greater than 0 to 1.0 nm, greater than 0.3 nm to 1.0 nm, greater than 0.3 nm to 0.6 nm, 0.6 nm or less, greater than 0 nm to 0.6 nm, 0.75 or less, greater than 0.3 nm to 0.75 nm, or greater than 0 nm to 0.75 nm. In this case, a total pore volume of the activated carbon surface may be in a range of about 0.5 $cm^3$/g to about 0.7 $cm^3$/g, and a pore volume of the ultra-micropores thereof may be in a range of about 0.4 $cm^3$/g to about 0.5 $cm^3$/g. Further, a volume of the ultra-micropore may be in a range of about 67 volume % to about 83 volume % of a total of 100 volume % of pores of the activated carbon surface. The specific surface area can be greatly improved by using a high pore volume ratio of the ultra-micropores having a high pore volume ratio. Specifically, a specific surface area of BET of the activated carbon may exceed about 672.7 m²/g. More specifically, the specific surface area may be in a range of greater than about 672.7 m²/g to about 1185.1 m²/g.

In step S40, a volume of the carbon dioxide may be in a range of about 10 volume % to about 50 volume % of a total of 100 volume % of the mixed gas. As a ratio of the carbon dioxide is increased, a specific surface area is increased by an introduction ratio of an oxygen functional group into precursor surfaces and micropore development.

However, if the ratio of the carbon dioxide is too high, a ratio of the micropores may be reduced, thereby reducing the specific surface area and the yield.

The activating (S40) may be performed at a temperature that is in a range of about 700° C. to about 1000° C. If the activating is performed at too low a temperature, of lower than 700° C., an activating effect may be reduced. If the activating is performed at too high a temperature, of higher than 1000° C., the yield may sharply deteriorate.

The activating may be performed while injecting a mixture gas of carbon dioxide and steam into a furnace, after the activated carbon precursors are introduced into the furnace. In this case, the mixture gas of the carbon dioxide and the steam may be introduced into the furnace into which the activated carbon precursors have been introduced at a speed that is in a range of about 1 ml/hr to about 100 ml/hr, and an internal pressure of the furnace may be adjusted in a range of greater than about 0 bar to about 5 bar. The internal pressure of the furnace may be adjusted in a range of about 2 bar to about 5 bar. If the internal pressure of the furnace is too low, the activating effect may be reduced. In contrast, if the internal pressure of the furnace is too high, breakage of micropores and development of pores that are larger than the mesopores may be significantly increased, thereby reducing the specific surface area. In addition, as the pressure is increased, a carbonization yield may be reduced.

The activating may be performed for a time that is in a range of about 1 hr to about 5 hrs. If an activating time is too long, the yield may be reduced, and a general structure of the pores of the material may be broken. In contrast, if the activating time is too short, an activating effect may be reduced.

Next, the activating (S50) of the activated carbon precursors by introducing the mixed gas including the carbon dioxide and the steam into the ground activated carbon precursors and performing the heat treatment thereon may be further performed. In step S50, the activated carbon, a metal salt, and a reducing agent are mixed and reacted in a solvent, and metal oxide particles are introduced onto the activated carbon. In step S40 described above, the carbon dioxide adsorptive capacity may be reduced by introducing an acidic site (δ). In order to solve this problem, a metal oxide that is advantageous for adsorption of the carbon dioxide may be introduced onto a surface thereof, thus the carbon dioxide adsorptive capacity may be improved. In this case, the metal oxide particles may be further easily introduced by the oxygen functional group formed on the surface in the activating described above.

In the introducing of a metal of the oxide particles (S50), the metal salt may include nickel, manganese, cobalt, zinc, yttrium, copper, iron, or two or more thereof. In addition, the metal salt may include a metal nitrate, a metal citrate, a metal hydrate, a metal sulfate, or a mixture of two or more thereof. The metal salt has high dissolubility for a solvent, thereby easily forming a reactive mixture.

Specifically, the metal salt may include a manganese nitrate, a magnesium nitrate, a nickel sulfate, a cupper nitrate, or a combination thereof.

In the introducing of the metal oxide particles (S50), the metal salt may be about 0.1 to 20 parts by weight based on 100 parts by weight of the activated carbon. Specifically, the metal salt may be about 5 to 15 parts by weight. If the mixed amount of the metal salt excessively increases, although the carbon dioxide adsorptive sites of the manufactured activated carbon may increase, since the formation of the micropores may be prevented, the above-described range is preferable.

The introducing of the metal oxide may be performed by mixing a precursor, a metal salt, and a reducing agent in a solvent and then performing heat treatment thereon. In this case, a temperature of the heat treatment may be in a range of about 80° C. to about 120° C. In the range, efficiency of the introducing of the metal oxide may be maximized. Specifically, the temperature of the heat treatment may be in a range of about 90° C. to about 110° C.

In the introducing of the metal oxide particles (S50), the reducing agent may include formaldehyde (HCHO), sodium borohydride, lithium aluminum hydride, or a mixture of two or more thereof. The reducing agent may serve to reduce metal ions contained in the metal salt, and the reduction may be performed in a hydrogen ion concentration (pH) of about 11 to 14 or about 11.5 to 12.5. When the hydrogen ion concentration (pH) increases and thus a strong base condition is formed, a reduction reaction speed increases by the reducing agent, thereby reducing a diameter of the metal particles. Accordingly, a size of the metal particles may be easily controlled by adjusting the hydrogen ion concentration. Although methods of adjusting the hydrogen ion concentration are not limited, for example, a method of adding an alkaline material therein while mixing a reaction mixture, a metal salt, and a reducing agent heat-treated at a temperature of about 800° C. to about 1000° C. in the presence of nitrogen gas, may be used. The alkaline material may include NaOH and the like.

In the introducing of the metal oxide particles (S50), the solvent may include a polyol solvent. However, various embodiments of the present invention are not limited thereto. Specifically, the solvent may be a solvent of pH 7 or more in which two hydroxyl groups (—OH) exist in one molecule. By using the solvent, dispersibility between solutes is improved, thereby easily controlling the size of the metal particles. Although the solvent of pH 7 or more in which two hydroxyl groups (—OH) exist in one molecule is not limited, for example, ethylene glycol, diethylene glycol, polyethylene glycol, 1,2-propanediol, dodecanediol, or a mixture of two or more thereof may be used.

The method for manufacturing the activated carbon may further include performing heat treatment in a range of about 250° C. to about 350° C. in an air atmosphere after the introducing of the metal oxide particles (S50). As the performing of the heat treatment in a range of about 250° C. to about 350° C. in the air atmosphere is included, the metal particles introduced on the surface of the activated carbon may be oxidized to form metal oxide particles. Since the metal oxide has basicity, it is possible to improve the selective adsorption of the carbon dioxide through the acid-base reaction with the carbon dioxide. Specifically, the heat treatment may be performed in a range of about 250° C. to about 350° C. for about 0.1 mins to about 10 mins. More specifically, the heat treatment may be performed at a temperature of about 270° C. to about 330° C. for about 0.5 mins to about 5 mins.

The following examples illustrate various embodiments of the present invention in more detail. However, the following examples are for illustrative purposes only, and the scope of various embodiments of the present invention are not limited thereto.

Example 1

A sample was obtained by introducing activated carbon precursors (e.g., polyvinylidene fluoride: PVDF) into a tubular furnace, heating them to about 800° C. at a temperature-increasing speed of about 2° C./min, and maintaining them for about 90 min to carbonize them. Then, the sample was cooled to room temperature. Thereafter, the sample was cleaned by using a hydrochloric acid solution of about 1 M and distilled water, and was then completely dried at about 120° C. for about 12 hrs.

The carbonized activated carbon precursors were then ground, sequentially cleaned by using a hydrochloric acid solution of about 1 M, and dried in a vacuum oven. In the ball mill grinding, zirconia balls having diameters of about 5 mm and about 10 mm were mixed (5 mm:10 mm=30 volume %:70 volume %) to be used, and the grinding was performed at about 360 rpm for about 1 hr. Further, a volume of the activated carbon precursors was to set as about 30 volume % of a total of 100 volume % of the balls used for the activated carbon precursors and the ball mill.

Then, the ground precursors were selected by using a sieve of about 150 um. Thereafter, carbonized starch was uniformly spread in an alumina boat and positioned in a tubular furnace.

Next, after the sample was heated to about 800° C. at a temperature-increasing speed of about 2° C./min under a nitrogen ($N_2$) atmosphere, the supply of nitrogen ($N_2$) gas was stopped, and carbon dioxide and distilled water were respectively injected at speeds of 50 ml/min and about 6 ml/hr to be activated while maintaining an internal pressure of the furnace of about 2 bar for about 1 hr.

Thereafter, the sample was cleaned by using a hydrochloric acid solution of about 0.1 M and distilled water, and then was completely dried at about 120° C. for about 12 hrs, to obtain activated carbon.

About 10 g of the dried activated carbon was added to an ethylene glycol solution in which about 1 g of a mixture of nickel nitrate and nickel sulfate was dissolved, and then agitated for about 1 hr.

Next, the solution to which the activated carbon was added was adjusted at about pH 11 with a NaOH solution, and then was further agitated for about 1 hr, and after slowly dripping about 3 ml of HCHO therein, it was agitated at about 100° C. for about 2 hrs. Next, the sample was cooled to room temperature, and then cleaned in ethanol and dried 5 times.

Next, oxidation treatment was performed on the activated carbon on which the metal oxide particles were introduced at about 300° C. for about 5 min in an air atmosphere in a tubular furnace, to obtain activated carbon.

Figure 2:
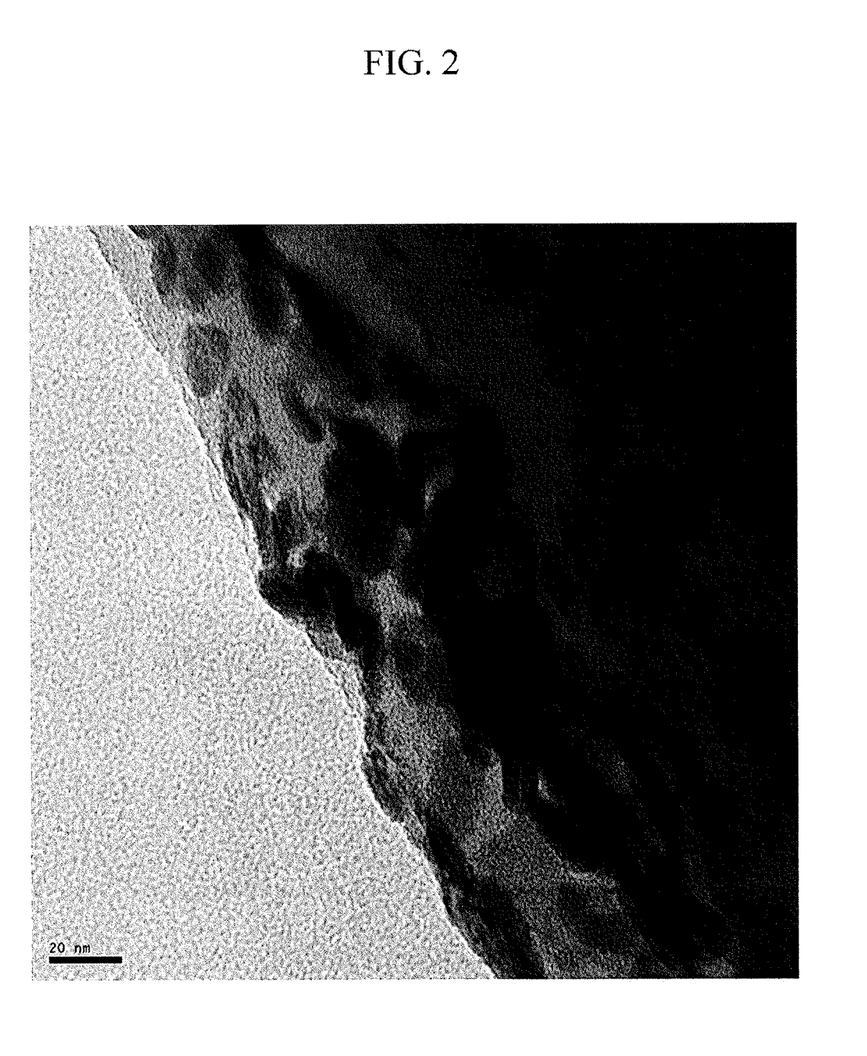
FIG. 2 illustrates a transmission electron microscope photograph of activated carbon manufactured by various embodiments of the present invention.

A TEM photograph of the manufactured activated carbon is shown in FIG. 2. As shown in FIG. 2, the manufactured activated carbon includes amorphous particles having a size of about 150 μm, and it can be seen that metal particles of about 5 to 10 nm are introduced on the surface thereof.

Example 2

A sample was obtained by introducing vegetable-based activated carbon precursors (starch) into a tubular furnace, heating them to 800° C. at a temperature-increasing speed of 2° C./min, and maintaining them for 90 min to carbonize them. Then, the sample was cooled to room temperature. Thereafter, the sample was cleaned by using a hydrochloric acid solution of about 1 M and distilled water, and then was completely dried at about 120° C. for about 12 hrs.

The carbonized activated carbon precursors were then ground, sequentially cleaned by using a hydrochloric acid solution of about 1 M, and dried in a vacuum oven. In the ball mill grinding, zirconia balls having diameters of about 5 mm and about 10 mm were mixed (5 mm:10 mm=30 volume %:70 volume %) to be used, and the grinding was performed at about 360 rpm for about 1 hr. Further, a volume of the activated carbon precursors was to set as about 30 volume % of a total of 100 volume % of the balls used for the activated carbon precursors and the ball mill.

Thereafter, carbonized starch was uniformly spread in an alumina boat and positioned in a tubular furnace.

Next, after the sample was heated to about 800° C. at a temperature-increasing speed of about 2° C./min under a nitrogen ($N_2$) atmosphere, the supply of nitrogen ($N_2$) gas was stopped, and carbon dioxide and distilled water were respectively injected at speeds of 50 ml/min and about 6 ml/hr to be activated while maintaining an internal pressure of the furnace of about 2 bar for about 1 hr.

Thereafter, the sample was cleaned by using a hydrochloric acid solution of about 0.1 M and distilled water, and then was completely dried at about 120° C. for about 12 hrs, to obtain activated carbon.

Comparative Example 1

A sample was obtained by introducing activated carbon precursors (e.g., polyvinylidene fluoride: PVDF) into a tubular furnace, heating them to about 800° C. at a temperature-increasing speed of about 2° C./min, and maintaining them for about 90 min to carbonize them. Then, the sample was cooled to room temperature. Thereafter, the sample was cleaned by using a hydrochloric acid solution of about 1 M and distilled water, and then was completely dried at about 120° C. for about 12 hrs.

The carbonized activated carbon precursors were then ground, sequentially cleaned by using a hydrochloric acid solution of about 1 M, and dried in a vacuum oven, to obtain activated carbon. In the ball mill grinding, zirconia balls having diameters of about 5 mm and about 10 mm were mixed (5 mm:10 mm=30 volume %:70 volume %) to be used, and the grinding was performed at about 360 rpm for about 1 hr. Further, a volume of the activated carbon precursors was to set as 30 volume % of a total of 100 volume % of the balls used for the activated carbon precursors and the ball mill.

Thereafter, carbonized starch was uniformly spread in an alumina boat and positioned in a tubular furnace.

Next, after the sample was heated to about 800° C. at a temperature-increasing speed of about 2° C./min under a nitrogen ($N_2$) atmosphere, the supply of nitrogen ($N_2$) gas was stopped, and distilled water was injected at a speed of about 6 ml/hr to be activated while maintaining an internal pressure of the furnace of about 2 bar for about 1 hr.

Thereafter, the sample was cleaned by using a hydrochloric acid solution of about 0.1 M and distilled water, and then was completely dried at about 120° C. for about 12 hrs, to obtain activated carbon.

Experimental Example

Experimental Example 1: Nitrogen Adsorption Experiment

A 77K/nitrogen adsorption experiment was performed by using BELSORP MAX equipment made in Japan by BEL-SORP company. A result thereof is shown in FIG. 3 and Table 1.

A deriving operation of data in Table 1 is as follows. A specific surface area was derived by using a Brunauer-Emmett-Teller (BET) formula. A total pore volume was calculated by using an adsorptive curve up to a relative pressure of 0.990, a micropore volume was derived by using a Dubinin-Radushkevich (D-R) formula, and a volume of mesopores was calculated by subtracting a volume of micropores from the total pore volume.

Figure 3:
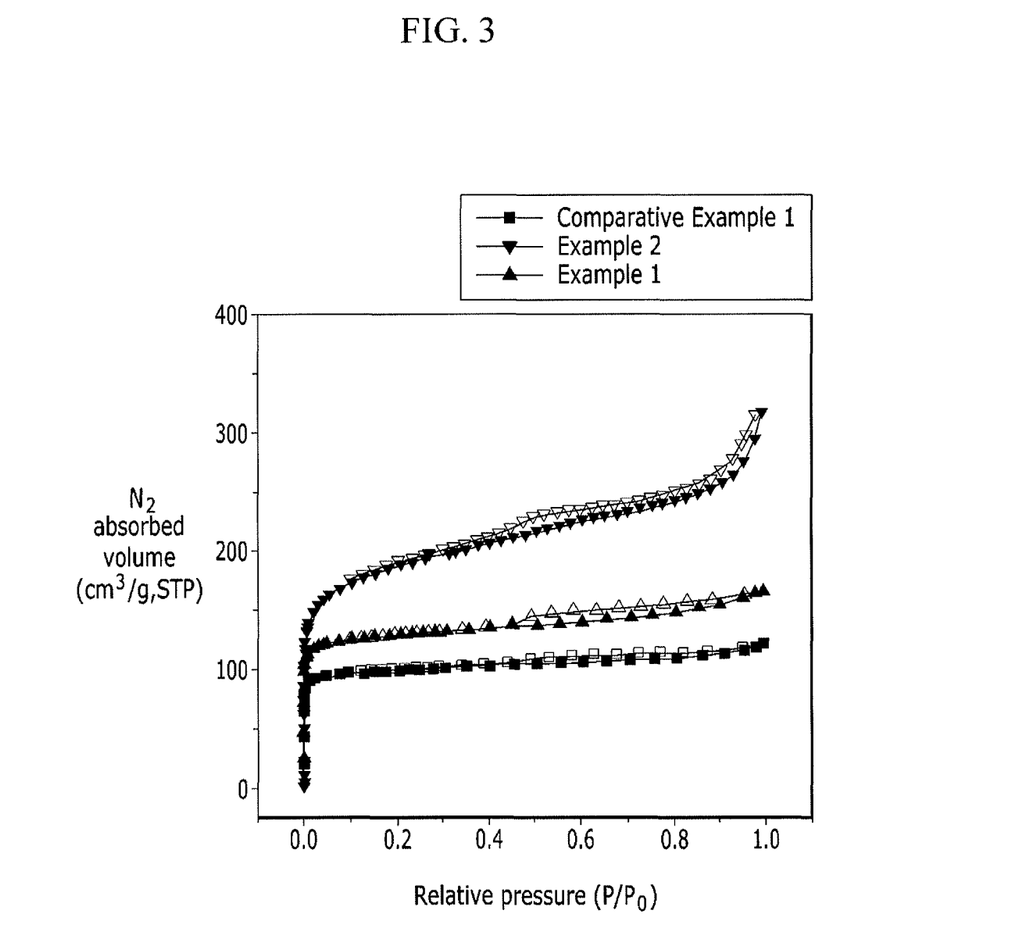
FIG. 3 illustrates result data of nitrogen adsorption experiments with respect to examples of various embodiments of the present invention and comparative examples.

As shown in FIG. 3 and Table 1, formation of the micropores is further improved in the activated carbon of Examples 1 and 2 performing the carbon dioxide-steam activation with both the oxidizing agent and the distilled water compared to Comparative Example 1 performing the steam activation with only the distilled water. Although micro-porosity is slightly reduced in Example 1 compared to Example 2, it can be seen that high micro-porosity is maintained in Example 1 compared to Comparative Example 1.

TABLE 1

| Classification | BET specific surface ($m^2g^{-1}$) | Total pore volume ($cm^3g^{-1}$) | Mesopore volume ($cm^3g^{-1}$) | Micropore volume ($cm^3g^{-1}$) |
|---|---|---|---|---|
| Example 1 | 540 | 0.234 | 0.025 | 0.209 |
| Example 2 | 655 | 0.489 | 0.167 | 0.322 |
| Comparative Example 1 | 390 | 0.186 | 0.050 | 0.136 |

Experimental Example 2: Carbon Dioxide Adsorption Experiment

Figure 4:
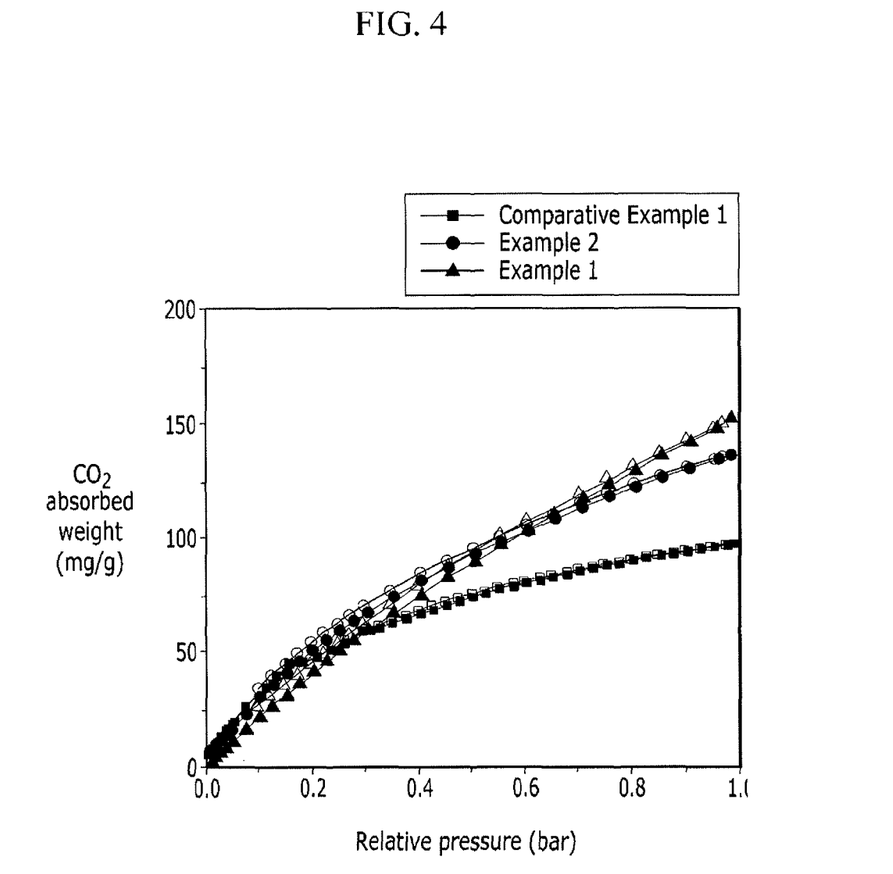
FIG. 4 illustrates measurement data for carbon dioxide adsorptive capacity with respect to activated carbon respectively manufactured by examples of various embodiments of the present invention and comparative examples.

A 298K/carbon dioxide adsorbing experiment was performed by using BELSORP MAX equipment made in Japan by BELSORP company. A result thereof is shown in FIG. 4. A solution obtained by mixing ethylene glycol and water at a ratio of 3:7 was introduced into a constant temperature oven to be maintained at 298 K, in order to maintain a room temperature state.

As shown in FIG. 4, in Comparative Example 1, a carbon dioxide adsorbing effect is hardly obtained. Further, it can be seen that the carbon dioxide adsorbing effect is improved in Example 1 using the carbon dioxide-steam activation and introducing the metal oxide particles on the surface thereof compared to Example 2 using only the carbon dioxide-steam activation.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing activated carbon, comprising:
   preparing activated carbon precursors;
   carbonizing the activated carbon precursors by performing a heat treatment on the carbon precursors;
   equalizing the activated carbon precursors carbonized in the carbonizing, by grinding the activated carbon precursors;
   activating the activated carbon precursors by introducing a mixture gas including carbon dioxide and steam into the ground activated carbon precursors and performing a heat treatment on the activated carbon precursors; and
   after the activating, introducing metal oxide particles on a surface of the activated carbon by mixing and reacting the activated carbon, a metal salt, and a metal oxide forming agent in a solvent followed by oxidation treatment on the activated carbon.

2. The method for manufacturing the activated carbon of claim 1, wherein in the activating, the mixed gas includes the carbon dioxide in an amount of approximately 10 to 50 volume % and the steam in an amount of approximately 50 to 90 volume %.

3. The method for manufacturing the activated carbon of claim 1, wherein the activating is performed in a temperature range of approximately 700° C. to approximately 1000° C.

4. The method for manufacturing the activated carbon of claim 1, wherein the activating is performed while introducing the mixture gas into the activated carbon precursors at a speed that is in a range of approximately 1 ml/hr to approximately 100 ml/hr.

5. The method for manufacturing the activated carbon of claim 1, wherein the activating is performed under a pressure equal to or less than approximately 5 bar.

6. The method for manufacturing the activated carbon of claim 1, wherein the activating is performed for approximately 1 to 5 hrs.

7. The method for manufacturing the activated carbon of claim 1, wherein in the introducing of the metal oxide particles, the metal salt includes nickel, manganese, cobalt, zinc, yttrium, copper, iron, and a combination of two or more thereof.

8. The method for manufacturing the activated carbon of claim 1, wherein in the introducing of the metal oxide particles, the metal salt include includes a manganese nitrate, a magnesium nitrate, a nickel sulfate, a copper nitrate, and a combination thereof.

9. The method for manufacturing the activated carbon of claim 1, wherein the introducing of the metal oxide particles is performed in a temperature range of approximately 80° C. to approximately 120° C.

10. The method for manufacturing the activated carbon of claim 1, wherein in the introducing of the metal oxide particles and prior to the oxidation treatment, the reacting further comprises adding a reducing agent selected from formaldehyde (HCHO), sodium borohydride, lithium aluminum hydride, and a mixture of two or more thereof.

11. The method for manufacturing the activated carbon of claim 1, wherein in the introducing of the metal oxide particles, the solvent includes a polyol solvent.

12. The method for manufacturing the activated carbon of claim 1, wherein in the introducing of the metal oxide particles, the solvent includes ethylene glycol, diethylene glycol, polyethylene glycol, 1,2-propanediol, dodecanediol, and a mixture of two or more thereof.

13. The method for manufacturing the activated carbon of claim 1, further comprising after the equalizing, selecting the equalized activated carbon precursors by using a sieve having a size in a range of 100 um to 250 um.

14. The method for manufacturing the activated carbon of claim 1, further comprising after the introducing of the metal oxide particles, performing heat treatment in a temperature range of approximately 250° C. to approximately 350° C. in an air atmosphere.

15. The method for manufacturing the activated carbon of claim 1, wherein the equalizing is performed using a ball mill, and a particle size of balls used for the ball mill is in a range of approximately 1 mm to approximately 20 mm.

16. The method for manufacturing the activated carbon of claim 15, wherein a volume of the activated carbon precursors is in a range of approximately 0.1 volume % to approximately 40 volume % for a total of 100 volume % of the balls used for the activated carbon precursors and the ball mill.

17. The method for manufacturing the activated carbon of claim 15, wherein a processing speed of the ball mill is in a range of approximately 100 rpm to approximately 500 rpm.

18. The method for manufacturing the activated carbon of claim 15, wherein a processing time of the ball mill is in a range of approximately 30 min to approximately 5 hrs.

19. The method for manufacturing the activated carbon of claim 1, wherein the carbonizing is performed in a temperature range of approximately 700° C. to approximately 1000° C.

20. The method for manufacturing the activated carbon of claim 1, wherein in the preparing of the activated carbon precursors, the activated carbon precursor includes at least one of poly(vinylidene fluoride), poly(vinylidene fluoride-co-shexafluoropropylene), poly(vinylidene chloride-co-acrylonitrile), poly(vinylidene chloride-co-acrylonitrile-co-methyl methacrylate), poly(vinylidene chloride-co-vinyl chloride), and poly(vinylidene chloride-co-methyl acrylate).

* * * * *